May 4, 1965   F. F. VAN RADEN   3,181,881
CLAMP FOR TRAILER REACH
Filed June 7, 1963   2 Sheets-Sheet 1
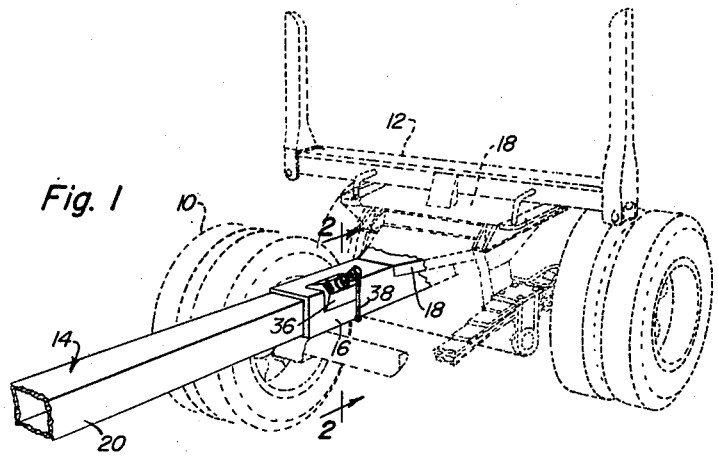
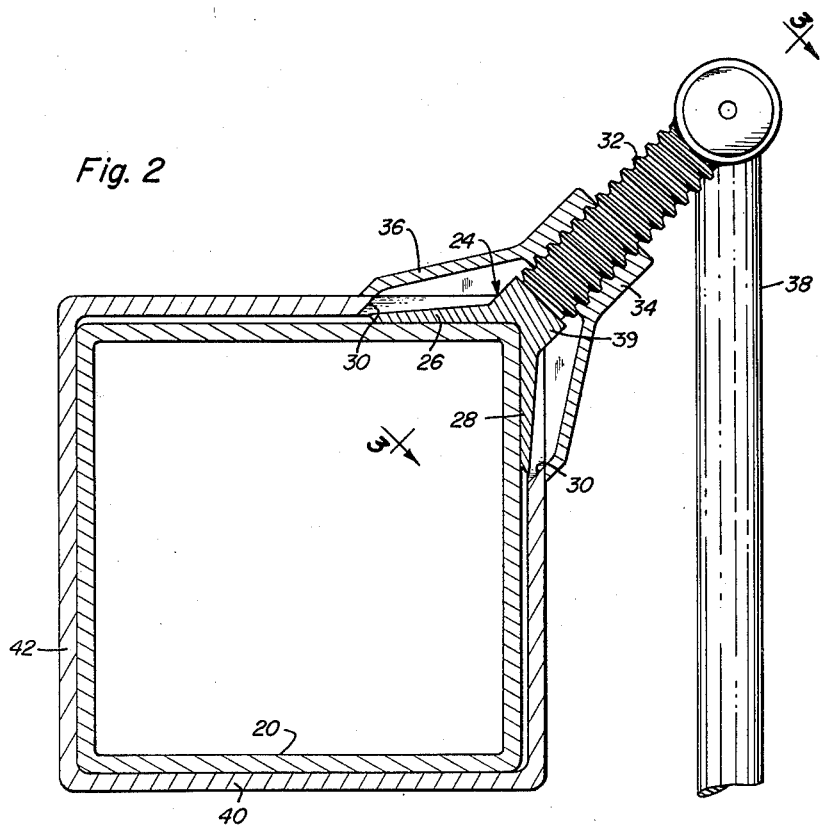
FREDERICK F. VAN RADEN
INVENTOR.
BY
BUCKHORN, BLORE, KLARQUIST & SPARKMAN
ATTORNEYS May 4, 1965

F. F. VAN RADEN 3,181,881

CLAMP FOR TRAILER REACH

Filed June 7, 1963

FREDERICK F. VAN RADEN
INVENTOR.

BY
BUCKHORN, BLORE, KLARQUIST & SPARKMAN
ATTORNEYS

United States Patent Office 3,181,881
Patented May 4, 1965

3,181,881
CLAMP FOR TRAILER REACH
Frederick F. Van Raden, Hillsboro, Oreg., assignor to Peerless Trailer and Truck Service, Inc., Portland, Oreg., a corporation of Oregon
Filed June 7, 1963, Ser. No. 286,258
3 Claims. (Cl. 280—34)

The present invention relates to trailer reaches and more particularly to a clamp means for an extensible trailer reach.

Truck trailers used for hauling long objects of various lengths are provided with extensible reaches so that the trailer length may be adjusted to that of the object or objects to be hauled. For example, in logging operations the length of the logs to be hauled will vary frequently, sometimes even from load to load and consequently it is desired to provide a reach which may be adjusted easily and quickly to accommodate the logs to be hauled.

A conventional reach structure comprises a pair of rectangular box-like members adapted to fit one within the other so that the length of the reach may be adjusted by sliding such members longitudinally relative to each other. Heretofore clamps have been provided to fix the members relative to one another, such clamps comprising a flat plate adapted to engage one face of the innermost reach with a screw or other means being provided between such plate and the outer reach member to move the plate into clamping engagement. However, such clamps are unsatisfactory for the reason that the face of the innermost reach tends to deform under pressure so that clamping pressure is maintained only along the outermost edges of the plate with the consequence that the clamp has little holding power.

It is, therefore, an object of the present invention to provide a new and improved reach clamp having superior holding power.

Another object of the present invention is to provide a reach clamp that will not deform the reach member that it engages.

Still another object of the invention is to provide a reach clamp that will not interfere with the assembly or disassembly of the reach.

Still other objects and advantages of the present invention will become more apparent hereinafter.

In accordance with an illustrated embodiment, the present invention comprises a trailer reach including a pair of box-like members of rectangular configuration adapted to slide one within the other. Mounted upon the outermost reach member is a clamping plate comprising right angularly disposed portions. The plate is disposed in one corner of the first member with the sides of the plate parallel to the adjacent sides of such member and a screw jack is provided to move such plate diagonally towards the opposite corner of the first outer reach member whereby it will move into engagement with the adjacent corner of the inner reach thus to clamp such inner reach member against the opposing walls of the outer reach member.

For a more complete description of the invention, reference is made to the embodiment thereof described in the accompanying drawings and to the following description thereof.

In the drawings FIG. 1 is a perspective view of a portion of a reach showing the arrangement of the clamp of the invention therein with a fragmentary portion of a trailer for a log truck being shown in dotted lines;

FIG. 2 is an enlarged sectional view taken substantially along line 2—2 of FIG. 1;

Figure 3:
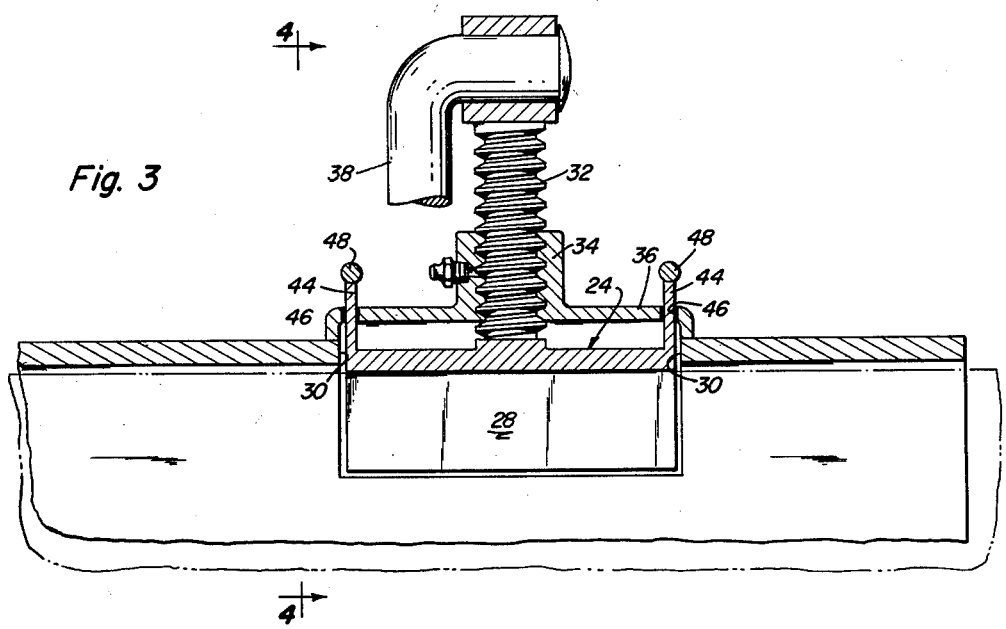
FIG. 3 is a view taken along line 3—3 of FIG. 2.
Figure 4:
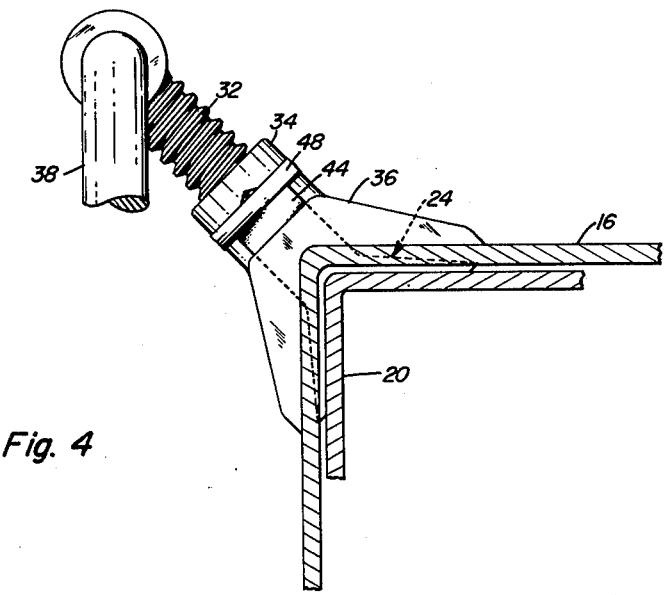
FIG. 4 is a sectional view taken along line 4—4 of FIG. 3.

Referring first to FIG. 1, shown in dotted lines therein is the rear assembly of a log truck pole trailer having wheels 10 and a bunk structure 12 on which the logs are supported. As is well known, such a trailer is connected through a reach 14 to the truck tractor not shown.

The illustrated reach 14 comprises an outer box-like, rectangular reach member 16 suitably secured to the frame 18 of the trailer. Extending into the reach member 16 is a similarly shaped reach member or tongue 20 which is also hollow. The reach members 16, 20 may be fabricated of steel plate by forming and welding or other suitable process.

The clamp of the invention comprises a rigid plate 24 having two portions 26, 28 extending at right angles to one another. A recess for receiving the plate 24 in one corner of the outer reach 16 is provided by cutting away a portion of the wall of such reach as indicated at 30. The plate 24 is mounted upon a screw jack including a screw 32, the axis of which is in alignment with the diagonal of the reach member 16, and which is received in a co-operatively threaded boss 34 formed upon a cast reinforcing plate 36 which is welded to the outer surface of the outer reach 16 so as to cover the cut-away portion 30 thereof. A handle 38 is provided to rotate the screw 32. The plate 24 is provided with a pad 39 upon which the end of the screw 32 bears.

As will be evident upon proper rotation of the screw 32 the plate 24 may be advanced from the recess 30 into engagement with the adjacent corner of the inner reach member 20 so as to force such reach member against the opposite walls 40, 42 of the outer reach 16. Preferably a stop means is provided to limit the inward movement of the plate 24 and which may comprise a pair of tongues 44 extending from the plate 24 outwardly through slots 46 in the plate 36. Enlarged heads 48 are welded to such tongues after the tongues are inserted through the slots 46. In assembling the reach members 16, 20 the tongues 44 are grasped manually and the plate 24 pulled into the recess 30 so that the inner reach member 20 may slide freely into position in the outer reach member 16.

It will be observed that in the clamping of the inner reach 20 advantage is taken of the strength of triangular structures for in effect the inner reach is made up of two opposed triangles. In any case, any tendency of the inner reach to collapse diagonally is accompanied by an outer bowing of the faces against which the plate portions 26, 28 bear so as to increase the frictional engagement of the clamping plate 24 with the inner reach. Accordingly, the clamping arrangement of the present invention has exceptionally great holding power.

Having illustrated and described a preferred embodiment of the invention it should be apparent to those skilled in the art that the invention permits of modification in arrangement and detail. I claim all such modifications as come within the true spirit and scope of the appended claims.

What is claimed is:
1. In a trailer reach,
   a first, elongate hollow reach member of rectangular cross section,
   a second, elongate hollow reach member of complementary rectangular cross section to said first reach member,
   said second reach member extending into said first reach member,
   a clamp means comprising a rigid plate having two portions extending at right angles to one another mounted within said first reach member with said portions extending parallel to adjacent walls of said first reach member,
   and releasable means operatively arranged between said plate and said first reach member for moving said plate diagonally of said first reach member into engagement with the adjacent corner of said second reach member to clamp the latter against movement relative to said first reach member.

2. A combination as set forth in claim 1 wherein said adjacent walls of said first reach member are recessed to receive said plate so that the latter may be moved to an out-of-the-way position when said second reach member is inserted into or removed from said first reach member.

3. A combination as set forth in claim 1 wherein said releasable means comprises a screw means to project and retract said plate.

References Cited by the Examiner
UNITED STATES PATENTS
2,519,113   8/50   Cohn _____ 280—34

FOREIGN PATENTS
214,789   4/61   Austria.

ARTHUR L. LA POINT, *Primary Examiner.*